(12) United States Patent
Zhang

(10) Patent No.: US 8,202,001 B1
(45) Date of Patent: Jun. 19, 2012

(54) SELF-OPENING BAG PACK AND METHOD THEREOF

(76) Inventor: Chunhua Zhang, Tongzhou (CN)

( * ) Notice: Subject to any disclaimer, the term of this patent is extended or adjusted under 35 U.S.C. 154(b) by 1547 days.

(21) Appl. No.: 11/626,852

(22) Filed: Jan. 25, 2007

Related U.S. Application Data

(60) Provisional application No. 60/762,323, filed on Jan. 26, 2006.

(51) Int. Cl.
*B65D 33/10* (2006.01)
*B31C 1/00* (2006.01)
*B31C 3/00* (2006.01)
*B31C 5/00* (2006.01)
*B32B 7/02* (2006.01)

(52) U.S. Cl. .......................... 383/37; 493/269; 428/218

(58) Field of Classification Search ............... 383/37; 493/269; 428/218
See application file for complete search history.

(56) References Cited

U.S. PATENT DOCUMENTS

| | | | |
|---|---|---|---|
| T888001 I4 | 7/1971 | Drake, Jr. | |
| 3,959,567 A | 5/1976 | Bradley | |
| 4,096,013 A | 6/1978 | Lutzmann et al. | |
| 4,264,392 A | 4/1981 | Watt | |
| 4,273,549 A | 6/1981 | Pezzana et al. | |
| 4,346,834 A * | 8/1982 | Mazumdar | 383/8 |
| 4,460,745 A * | 7/1984 | Adur et al. | 525/74 |
| 4,481,669 A | 11/1984 | Pezzana et al. | |
| 4,537,836 A * | 8/1985 | Adur et al. | 428/522 |
| 4,704,101 A | 11/1987 | Schirmer | |
| 4,989,732 A | 2/1991 | Smith | |
| 4,995,860 A | 2/1991 | Wilfong, Jr. | |
| 5,087,234 A | 2/1992 | Prader et al. | |
| 5,183,158 A | 2/1993 | Boyd et al. | |
| 5,335,788 A | 8/1994 | Beasley et al. | |
| 5,469,969 A | 11/1995 | Huang | |
| 5,491,011 A * | 2/1996 | Pezzoli et al. | 428/36.7 |
| 5,561,967 A | 10/1996 | Nguyen | |
| 5,562,580 A | 10/1996 | Beasley et al. | |
| 5,635,262 A * | 6/1997 | Best et al. | 428/36.92 |
| 5,670,013 A | 9/1997 | Huang et al. | |
| 5,695,064 A | 12/1997 | Huang et al. | |
| 5,747,594 A * | 5/1998 | deGroot et al. | 525/240 |
| 5,756,193 A * | 5/1998 | Yamamoto et al. | 428/220 |
| 5,938,033 A | 8/1999 | Huang et al. | |
| 5,967,962 A | 10/1999 | Huang et al. | |
| 5,989,725 A * | 11/1999 | Bullard et al. | 428/516 |
| 6,105,780 A * | 8/2000 | Nguyen | 206/554 |
| 6,142,302 A | 11/2000 | Requena | |
| 6,149,007 A * | 11/2000 | Yeh et al. | 206/554 |

(Continued)

FOREIGN PATENT DOCUMENTS

CA 2095880 C 3/1995

(Continued)

*Primary Examiner* — Nathan J Newhouse
*Assistant Examiner* — Latrice Byrd
(74) *Attorney, Agent, or Firm* — Anova Law Group, PLLC

(57) ABSTRACT

Disclosed herein is a self-opening bag pack comprising a plurality of bags comprising or obtainable from a polymer composition comprising an effective amount of medium density polyethylene. Each of the bags may include a front wall, a rear wall, a bottom portion integrally connected with both the front wall and the rear wall, and a bag mouth opposed to the bottom portion, wherein the front and rear walls being integrally joined at their sides; and at least a portion of the outer surface of the front and rear walls of each of the bags having been surface-treated. The process of making the self-opening bag pack is also disclosed.

16 Claims, 2 Drawing Sheets

Production Process Chart

U.S. PATENT DOCUMENTS

| | | | |
|---|---|---|---|
| 6,316,067 B1 * | 11/2001 | Edwards et al. | 428/34.9 |
| 6,355,733 B1 * | 3/2002 | Williams et al. | 525/191 |
| 6,435,350 B1 | 8/2002 | Huang et al. | |
| 6,446,810 B1 | 9/2002 | Huang et al. | |
| 6,446,811 B1 | 9/2002 | Wilfong, Jr. | |
| 6,502,371 B2 | 1/2003 | DeMatteis | |
| 6,552,150 B1 * | 4/2003 | Nummila-Pakarinen et al. | 526/352 |
| 6,564,970 B1 | 5/2003 | Walch et al. | |
| 6,613,841 B2 * | 9/2003 | Williams | 525/191 |
| 6,903,162 B2 * | 6/2005 | Nygard et al. | 525/191 |
| 7,041,351 B1 * | 5/2006 | Tse et al. | 428/36.7 |
| 7,267,856 B2 * | 9/2007 | Patel et al. | 428/35.2 |
| 2005/0041890 A1 * | 2/2005 | Tan | 383/37 |

FOREIGN PATENT DOCUMENTS

| | | |
|---|---|---|
| CA | 2113843 C | 6/1996 |
| EP | 0562883 | 2/1994 |
| EP | 0562889 | 2/1994 |

\* cited by examiner

A. Film blowing step
B. Corona treatment step
C. Printing step
D. Gusset forming step
E. Rolling up step
F. Bag forming step
G. Die cutting and pressing step
H. Packaging step

SELF-OPENING BAG PACK AND METHOD THEREOF

PRIOR RELATED APPLICATION

This application claims priority to U.S. Provisional Patent Application Ser. No. 60/762,323, filed Jan. 26, 2006, which is incorporated herein by reference in its entirety.

FIELD OF THE INVENTION

The invention relates to a self-opening bag pack comprising multiple self-opening bags in a flattened condition and methods of making such bag packs.

BACKGROUND OF THE INVENTION

A plastic bag is generally a bag made of thin, flexible, plastic sheet. Since the mid-1980's, the use of plastic bags for shopping has grown dramatically due to the great advantage plastic bags have over bags made of other materials, such as paper. There are many types of plastic bags, some of which are made of low or high density polyethylene (LDPE and HDPE, respectively). LDPE and HDPE bags are generally stronger, lighter and much more compact to store than paper bags. These properties make LDPE and HDPE bags less expensive to transport. LDPE and HDPE bags can be manufactured and sold at a fraction of the cost of competing paper bags, making them the bags of choice for retailers such as supermarkets and groceries stores.

Many plastic bags used by retailers are self-opening bags because of their conveniences. Many self-opening bag packs employ an adhesive means between consecutive bags so that pulling the first bag will also open the next bag behind the first one. In some self-opening bags, the adhesive means is a chemical adhesive such as glues or pressure sensitive adhesives. However, the use of chemical adhesive means may not be desirable in some applications.

In some applications, it is desirable that some self-opening bags are made of plastic materials that have an optimum amount of self-adhesion or blocking. If the amount of self-adhesion of the plastic materials is too large, it is difficult to have the bags self-open. On the other hand, if the amount of self-adhesion of the plastic materials is too low, each bag will detach from the next consecutive empty bag prematurely without pulling open the empty bag.

Currently, most of the self-opening bags can be made of a low density polyethylene such as low density polyethylene (LDPE) or linear low density polyethylene (LLDPE). It is well-known that LDPE and LLDPE films tend to self-adhere and the self-adhesion is generally too large for self-opening bag applications. On the other hand, the self-adhesion of high density polyethylene (HDPE) is generally too low for self-opening bag applications because HDPE does not tend to self-adhere.

For the foregoing reasons, there are needs for a polymer or polymer composition that can be used for making improved self-opening bag packs which can provide more reliable and consistent self-opening features than pure HDPE, LLDPE or LDPE bags. Further, there are needs for a polymer or polymer composition that has a lower self-adhesion property than that of LLDPE or LDPE and/or a higher self-adhesion property than that of HDPE.

SUMMARY OF THE INVENTION

This invention relates to a self-opening bag pack comprising a plurality of bags comprising or obtainable from a polymer composition comprising medium density polyethylene (MDPE) which can provide more desirable self-adhesion and mechanical properties than HDPE, LDPE and LLDPE. In some embodiments, the polymer composition further comprises HDPE, LDPE, LLDPE or a combination thereof.

In one aspect, the invention encompasses a pack of self-opening bags comprising a plurality of bags comprising or obtainable from a polymer composition comprising an effective amount of a medium density polyethylene.

In another aspect, the invention encompasses a method of making a pack of self-opening bags comprising the steps of:
(a) providing a polymer composition comprising an effective amount of a medium density polyethylene;
(b) forming a film or a continuous tube from the polymer composition;
(c) converting the continuous tube into a plurality of self-opening bags; and
(d) stacking the plurality of self-opening bags.

In some embodiments, the medium density polyethylene has a density from about 0.930 to about 0.940 g/cc.

In some embodiments, the medium density polyethylene has a melt index $MI_2$ from about 0.1 to about 0.3.

In some embodiments, the self-opening bags are of the T-shirt type.

In some embodiments, the continuous tube is formed by a blown film extrusion process. In other embodiments, the continuous tube is flattened to a film during the converting step.

In some embodiments, the method of making the pack of self-opening bags further comprises a step of corona-treating the surfaces of the film. In other embodiments, the method of making the pack of self-opening bags further comprises a step of forming at least one localized compressed area in the self-opening bags.

In some embodiments, the surface tension of the surface-treated surface is greater than about 30 dynes/cm or about 38 dynes/cm.

In some embodiments, the polymer composition further comprises a high density polyethylene, low density polyethylene, a linear low density polyethylene or a combination thereof. In other embodiments, the polymer composition comprises at least about 50 wt. % of a medium density polyethylene and less than about 45 wt. % of a high density polyethylene, based on the total weight of the polymer composition. In further embodiments, the polymer composition comprises at least about 50 wt. % of a medium density polyethylene and less than about 45 wt. % of a high density polyethylene, based on the total weight of the medium density polyethylene and the high density polyethylene.

In some embodiments, the high density polyethylene has a density greater than 0.950 g/cc.

In some embodiments, the high density polyethylene has a melt index $MI_2$ from about 0.04 to about 0.10.

In some embodiments, the polymer composition further comprises at least an additive selected from the group consisting of colorants or pigments, fillers, slip agents, plasticizers, oils, antioxidants, UV stabilizers, lubricants, antifogging agents, flow aids, coupling agents, cross-linking agents, nucleating agents, surfactants, solvents, flame retardants, antistatic agents, polysiloxanes and combinations thereof.

In some embodiments, each of the self-opening bags includes a front wall, a rear wall, a bottom portion integrally connected with both the front wall and the rear wall, and a bag mouth opposed to the bottom portion, wherein the front and rear walls being integrally joined at their sides. In some embodiments, at least a portion of the outer surface of the front and rear walls of each of the bags has been surface-treated. In other embodiments, the outer surface is surface-treated by corona treatment. In further embodiments, the surface tension of the surface-treated surface is greater than about 30 dynes/cm or greater than about 38 dynes/cm.

In some embodiments, the polymer composition comprises at least about 55 wt. % of the medium density polyethylene, based on the total weight of the polymer composition.

In some embodiments, the polymer composition comprises at least about 60 wt. % of the medium density polyethylene, based on the total weight of the polymer composition.

In some embodiments, the polymer composition comprises at least about 70 wt. % of the medium density polyethylene, based on the total weight of the polymer composition.

In some embodiments, the polymer composition comprises at least about 80 wt. % of the medium density polyethylene, based on the total weight of the polymer composition.

In some embodiments, the polymer composition comprises at least about 90 wt. % of the medium density polyethylene, based on the total weight of the polymer composition.

In some embodiments, the polymer composition comprises less than about 40% high density polyethylene, based on the total weight of the polymer composition.

In some embodiments, the polymer composition comprises less than about 30% high density polyethylene, based on the total weight of the polymer composition.

In some embodiments, the polymer composition comprises less than about 20% high density polyethylene, based on the total weight of the polymer composition.

In some embodiments, the polymer composition comprises less than about 10% high density polyethylene, based on the total weight of the polymer composition.

In some embodiments, the polymer composition comprises less than about 5% high density polyethylene, based on the total weight of the polymer composition.

In some embodiments, the self-opening bag pack further comprises at least one localized compressed area. In other embodiments, the self-opening bag pack comprises two or more localized compressed areas. In further embodiments, each of the compressed areas is below the bag mouth.

In some embodiments, the self-opening bag pack comprises from about 30 to about 300 bags.

In some embodiments, each of the self-opening bags includes side gussets. In other embodiments, each of the self-opening bags includes bottom gussets.

In some embodiments, the self-opening bag pack further comprises a central tab portion detachably connected to the open top mouth portion of the bags in the bag pack.

In some embodiments, the self-opening bag pack further comprises one or more apertures positioned below the bag mouth.

DETAILED DESCRIPTION

Figure 1:
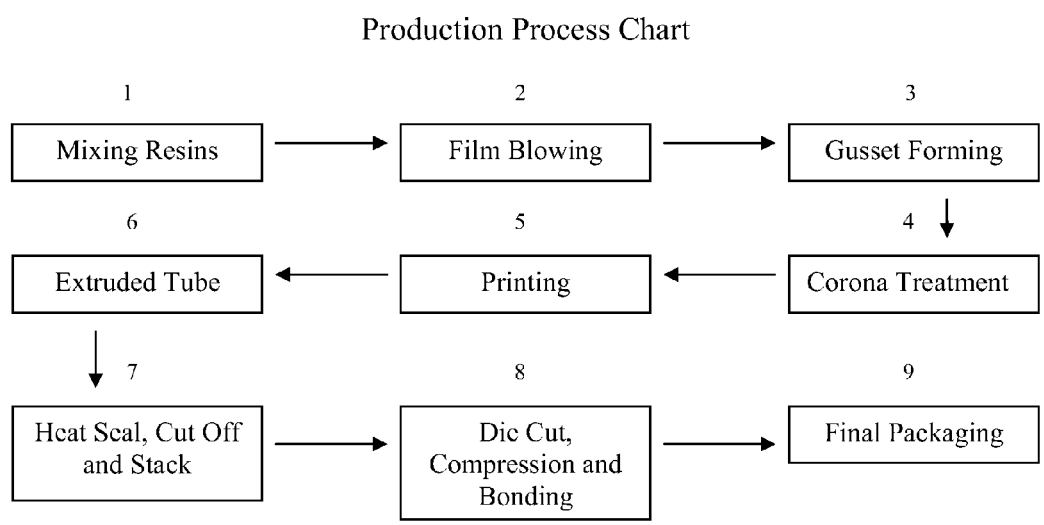
FIG. 1 is a flow chart of an embodiment of the process employed to produce a stack of self-opening bags disclosed herein.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

To meet at least one of the above-mentioned needs, this invention features a self-opening bag pack comprising a plurality of bags comprising or obtainable from a polymer composition comprising medium density polyethylene (MDPE) which can provide more desirable self-adhesion properties than HDPE, LDPE and LLDPE. In one aspect, the self-opening bag pack disclosed herein comprises a plurality of bags comprising or obtainable from a polymer composition comprising an effective amount of a medium density polyethylene.

As used herein, and unless otherwise specified, an "effective amount" of a medium density polyethylene is an amount sufficient to provide a self-opening bag pack with desirable self-opening property and mechanical strength. In some embodiments, an effective amount of medium density polyethylene means an amount of medium density polyethylene, alone or in combination with any other polymer or additive, which provides a test value of greater than greater than about 50%, greater than about 55%, greater than about 60%, or greater than about 65% in the self-opening test disclosed herein. In other embodiments, an effective amount of medium density polyethylene means an amount of medium density polyethylene, alone or in combination with any other polymer or additive, which provides a test value of greater than 95 g, greater than about 98 g, greater than about 100 g, greater than about 102 g or greater than about 104 g in the Dart Drop test disclosed herein. In further embodiments, an effective amount of medium density polyethylene means an amount of medium density polyethylene, alone or in combination with any other polymer or additive, which provides a test value of greater than about 50%, greater than about 55%, greater than about 60%, or greater than about 65% in the self-opening test and a test value of greater than 95 g, greater than about 98 g, greater than about 100 g, greater than about 102 g or greater than about 104 g in the Dart Drop test.

In some embodiments, the polymer composition disclosed herein comprises at least about 50 wt. % of MDPE and less than about 45 wt. % of HDPE, based on the total weight of the polymer composition. In some embodiments, the polymer composition comprises at least about 50 wt. % of a medium density polyethylene and less than about 45 wt. % of a high density polyethylene, based on the total weight of the medium density polyethylene and the high density polyethylene.

In some embodiments, each of the bags includes front and rear walls, the front and rear walls being integrally joined at their sides and secured together at their bottoms and defining an open top mouth portion. In other embodiments, at least an upper portion of the outer surface of the front and rear walls of each of the bags are corona-treated. In further embodiments, at least one localized compressed area extends transversely through the pack in the upper portion of the bags such that the pack has a decreased thickness in the compressed area and wherein adjacent outer wall corona-treated surfaces defined by the localized compressed area are releasably adhered together and adjacent inside wall surfaces defined by the localized compressed area are not adhered together.

Generally, polyethylene (PE) can be classified into several different categories based mostly on its density. The density of PE may depend on many factors such as the extent and type of branching, the crystal structure, and the molecular weight. According to ASTM D4976-06: *Standard Specification for Polyethylene Plastic Molding and Extrusion Materials*, polyethylene (PE) can be classified into high-density (HDPE, density greater than 0.941 g/cc), medium-density (MDPE, density from greater than 0.925 to 0.940 g/cc), low-density (LDPE, density from 0.910 to 0.925 g/cc), and linear low-density polyethylene (LLDPE, density from 0.910 to 0.925 g/cc). ASTM D4976 is incorporated herein by reference. Further, some of other common categories of PE are ultra high molecular weight polyethylene (UHMWPE), high molecular weight polyethylene (HMWPE), high density cross-linked polyethylene (HDXLPE), cross-linked polyethylene (PEX), very low density polyethylene (VLDPE) and the like. The chemical and physical properties of polyethylene are disclosed in Andrew Peacock, "*Handbook of Polyethylene: Structures, Properties, and Applications*," Marcel Dekker, Inc., New York (2000), which is incorporated herein by reference.

The density of polyethylene can be measured according to ASTM D 1505-98—*Standard Test Method for Density of Plastics by the Density-Gradient Technique* using specimens prepared by the procedure described in Procedure C of ASTM D-1928—*Standard Practice for Preparation of Compression-Molded Polyethylene Test Sheets and Test Specimens*, both of which are incorporated herein by reference. ASTM D 1505-98 is based on observing the level to which a test specimen sinks in a liquid column exhibiting a density gradient, in comparison with standards of known density. ASTM D-1928-96 covers the preparation of compression-molded test sheets of polyethylene. The C procedure of ASTM D-1928-96 provides for molded test sheets to be prepared by cooling the platens of the compression press, and hence the molten polyethylene, at a controlled rate of 15+2° C./minute.

HDPE generally have a low degree of branching and thus stronger intermolecular forces and tensile strength. HDPE can be made from ethylene using any catalyst system that can reduce or eliminate branching. Some non-limiting examples of suitable catalysts for making HDPE include chromium catalysts and Ziegler-Natta catalysts. Some non-limiting examples of suitable HDPE for the self-opening bag pack disclosed herein include HDPE 50005 and 7000F (both are commercially available from Honam Petrochemical Corporation, Seoul, South Korea); HDPE 9001 (commercially available from Formosa Plastics Corporation, Taipei, Taiwan); and HDPE E308, E309 and F600 (all are commercially available from Korea KPIC).

Any HDPE having a density greater than 0.940 g/cc can be used to make the self-opening bag pack disclosed herein. In some embodiments, the density of the HDPE is greater than about 0.941 g/cc, greater than about 0.942 g/cc, greater than about 0.943 g/cc, greater than about 0.944 g/cc, greater than about 0.945 g/cc, greater than about 0.946 g/cc, greater than about 0.947 g/cc, greater than about 0.948 g/cc or greater than about 0.949 g/cc. In other embodiments, the density of the HDPE is greater than about 0.950 g/cc, greater than about 0.951 g/cc, greater than about 0.952 g/cc, greater than about 0.953 g/cc, greater than about 0.954 g/cc, or greater than about 0.955 g/cc.

The amount of HDPE in the polymer composition can be less than about 50 wt. %, less than about 45 wt. %, less than about 40 wt. %, less than about 35 wt. %, less than about 30 wt. %, less than about 25 wt. %, less than about 20 wt. %, less than about 15 wt. %, less than about 10 wt. %, less than about 5 wt. %, less than about 1 wt. %, less than about 0.1 wt. %, or less than about 0.01 wt. %, based on the total weight of the polymer composition or based on the total weight of the medium density polyethylene and the high density polyethylene. In certain embodiments, the amount of HDPE in the polymer composition is from about 0 wt. % to about 49 wt. %, from about 0.01 wt. % to about 45 wt. %, from about 0.1 wt. % to about 40 wt. %, from about 0.5 wt. % to about 35 wt. %, from about 1 wt. % to about 30 wt. %, from about 1 wt. % to about 25 wt. %, from about 1 wt. % to about 20 wt. %, from about 1 wt. % to about 15 wt. %, or from about 1 wt. % to about 10 wt. %, based on the total weight of the polymer composition or based on the total weight of the medium density polyethylene and the high density polyethylene.

In some embodiments, the polymer composition is substantially free of HDPE. As used herein and unless otherwise indicated, a composition that is "substantially free" of a compound means that the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the compound, based on the total weight of the composition.

In some embodiments, the HDPE has a density greater than about 0.945 g/cc. In other embodiments, the HDPE has a density greater than about 0.948 g/cc. In further embodiments, the HDPE has a highly linear structure without significant branching. In further embodiments, the HDPE has a crystallinity of greater than about 85%. In further embodiments, the HDPE is prepared by the polymerization of ethylene using Ziegler catalysts to thereby provide the highly linear, highly crystalline polymer. In further embodiments, the HDPE employed to form the extruded tubes in the state of the art preferably has a melt index ($MI_2$) of at least about 0.04. In further embodiments, the melt index of the HDPE is from about 0.05 to about 0.07. In further embodiments, the HDPE has a density of 0.948-0.950 Wee and a melt index ($MI_2$) of 0.057. Melt index, or $I_2$, is measured in accordance with ASTM D1238, Condition 190° C./2.16 kg, which is incorporated herein by reference.

MDPE can be made from ethylene using a chromium/silica catalyst, Ziegler-Natta catalyst or metallocene catalyst. In some embodiments, MDPE may be obtained from copolymerizing ethylene with a small amount (e.g., less than 10%) of a short-chain alpha-olefin such as 1-butene, 1-hexene, and 1-octene. Some non-limiting examples of suitable MDPE for the self-opening bag pack disclosed herein include MDPE TR131 (Commercially available from Chevron Phillips Chemical Company LLC, Woodlands, Tex.) and MDPE FB2310 (Commercially available from Abu Dhabi Polymers Company Limited, Abu Dhabi, United Arab Emirates).

As defined by ASTM D4976-06, MDPE disclosed herein has a density from greater than 0.925 to 0.940 g/cc. In some embodiments, the density of the MDPE disclosed herein is from about 0.926 to about 0.939 g/cc, from about 0.926 to about 0.938 g/cc, from about 0.926 to about 0.937 g/cc, from about 0.926 to about 0.936 g/cc, from about 0.927 to about 0.940 g/cc, from about 0.928 to about 0.940 g/cc, from about 0.929 to about 0.940 g/cc, from about 0.930 to about 0.940 g/cc, from about 0.930 to about 0.940 g/cc, from about 0.930 to about 0.939 g/cc or from about 0.930 to about 0.938 g/cc.

The amount of MDPE in the polymer composition can be at least about 50 wt. %, at least about 52 wt. %, at least about 54 wt. %, at least about 56 wt. %, at least about 58 wt. %, at least about 60 wt. %, at least about 65 wt. %, at least about 70 wt. %, at least about 75 wt. %, at least about 80 wt. %, at least about 85 wt. %, at least about 90 wt. %, or at least about 95 wt. %, based on the total weight of the polymer composition or based on the total weight of the medium density polyethylene and the high density polyethylene. In certain embodiments, the amount of MDPE in the polymer composition is from about 50 wt. % to about 100 wt. %, from about 50 wt. % to about 99 wt. %, from about 50 wt. % to about 95 wt. %, from about 50 wt. % to about 90 wt. %, from about 50 wt. % to about 85 wt. %, from about 50 wt. % to about 80 wt. %, from about 50 wt. % to about 75 wt. %, from about 55 wt. % to about 99 wt. %, or from about 60 wt. % to about 95 wt. %, based on the total weight of the polymer composition or based on the total weight of the medium density polyethylene and the high density polyethylene.

In some embodiments, the polymer composition is substantially pure MDPE As used herein, a composition that is a "substantially pure" compound is substantially free of one or more other compounds, i.e., the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the one or more other compounds, based on the total weight of the composition.

In some embodiments, the MDPE employed to form the extruded tubes has a melt index ($MI_2$) of at least about 0.1. In further embodiments, the melt index of the MDPE is from about 0.1 to about 0.3. In further embodiments, the HDPE has a density of 0.948-0.950 g/cc and a melt index ($MI_2$) of 0.057. For comparison, the melt index ($MI_2$) of the MDPE disclosed herein is about 0.2 whereas the $MI_2$ of HDPE is from about 0.04 to about 0.07. Further, the density of the MDPE disclosed herein is from about 0.931 to about 0.938 whereas the density of HDPE is from about 0.945 to about 0.960.

Optionally, the polymer compositions disclosed herein can comprise LLDPE which can include polyethylenes having a density range from 0.915 to 0.925 gkc. Generally, LLDPE is a substantially linear polymer, with significant numbers of short branches, commonly made by copolymerization of ethylene with a short-chain alpha-olefin such as 1-butene, 1-hexene, and 1-octene. Some non-limiting examples of suitable LLDPE for the self-opening bag pack disclosed herein include LLDPE 6130AA, 6208AF, 6430AA, 6608AF, 6608LJ, 6910AA, 6910KJ, 6930AA, 8109AA and 8109KJ (all are commercially available from BP Chemicals Ltd, Middlesex, UK), LLDPE 0209AA (commercially available from Arak Petrochemical Company, Tehran, Iran), LLDPE FC18N (commercially available from Eastern Petrochemical Company (SHARQ), Al-Jubail, Saudi Arabia), LLDPE 118N and 218W (both are commercially available from Saudi Basic Industries Corporation, Riyadh, Saudi Arabia), and LLDPE 153S (commercially available from The Polyolefin Company, Singapore).

Any LLDPE with a density from 0.915 to 0.925 g/cc can be used to make the self-opening bag pack disclosed herein. In some embodiments, the density of the LLDPE is from about 0.915 to about 0.925 g/cc, from about 0.914 to about 0.925 g/cc, from about 0.913 to about 0.925 g/cc, from about 0.912 to about 0.925 g/cc, from about 0.911 to about 0.925 g/cc, from about 0.910 to about 0.925 g/cc, from about 0.915 to about 0.924 g/cc, from about 0.915 to about 0.923 g/cc, from about 0.915 to about 0.922 g/cc, from about 0.915 to about 0.921 g/cc or from about 0.915 to about 0.920 g/cc.

The amount of LLDPE in the polymer composition can be less than about 50 wt. %, less than about 45 wt. %, less than about 40 wt. %, less than about 35 wt. %, less than about 30 wt. %, less than about 25 wt. %, less than about 20 wt. %, less than about 15 wt. %, less than about 10 wt. %, less than about 5 wt. %, less than about 1 wt. %, less than about 0.1 wt. %, or less than about 0.01 wt. %, based on the total weight of the polymer composition. In certain embodiments, the amount of LLDPE in the polymer composition is from about 0 wt. % to about 49 wt. %, from about 0.01 wt. % to about 45 wt. %, from about 0.1 wt. % to about 40 wt. %, from about 0.5 wt. % to about 35 wt. %, from about 1 wt. % to about 30 wt. %, from about 1 wt. % to about 25 wt. %, from about 1 wt. % to about 20 wt. %, from about 1 wt. % to about 15 wt. %, or from about 1 wt. % to about 10 wt. %, based on the total weight of the polymer composition. In some embodiments, the polymer composition is substantially free of LLDPE.

Optionally, the polymer compositions disclosed herein can comprise LDPE which can include polyethylenes having a density range from 0.910 to 0.925 g/cc. Generally, LDPE has a high degree of short and long chain branching, which results in a loose packing in the crystal structure and consequently a relatively low density. LDPE can be made by free radical polymerization. Some non-limiting examples of suitable LDPE for the self-opening bag pack disclosed herein include LDPE 200GG (commercially available from TITAN Chemicals, Johor, Malaysia) and LDPE F101, F108-5, F210, F210-6, F410-1, F410-3, F410-5, F410-7 and F702-3 (all are commercially available from The Polyolefin Company, Singapore).

Any LDPE with a density from 0.910 to 0.940 g/cc can be used to make the self-opening bag pack disclosed herein. In some embodiments, the density of the LDPE is from about 0.910 to about 0.940 g/cc, from about 0.912 to about 0.940 g/cc, from about 0.914 to about 0.940 g/cc, from about 0.916 to about 0.940 g/cc, from about 0.918 to about 0.940 g/cc, from about 0.920 to about 0.940 g/cc, from about 0.910 to about 0.935 g/cc, from about 0.910 to about 0.930 g/cc, from about 0.910 to about 0.925 g/cc, or from about 0.910 to about 0.920 g/cc.

The amount of LDPE in the polymer composition can be less than about 50 wt. %, less than about 45 wt. %, less than about 40 wt. %, less than about 35 wt. %, less than about 30 wt. %, less than about 25 wt. %, less than about 20 wt. %, less than about 15 wt. %, less than about 10 wt. %, less than about 5 wt. %, less than about 1 wt. %, less than about 0.1 wt. %, or less than about 0.01 wt. %, based on the total weight of the polymer composition. In certain embodiments, the amount of LDPE in the polymer composition is from about 0 wt. % to about 49 wt. %, from about 0.01 wt. % to about 45 wt. %, from about 0.1 wt. % to about 40 wt. %, from about 0.5 wt. % to about 35 wt. %, from about 1 wt. % to about 30 wt. %, from about 1 wt. % to about 25 wt. %, from about 1 wt. % to about 20 wt. %, from about 1 wt. % to about 15 wt. %, or from about 1 wt. % to about 10 wt. %, based on the total weight of the polymer composition. In some embodiments, the polymer composition is substantially free of LDPE.

Optionally, the polymer compositions disclosed herein can comprise VLDPE which can include polyethylenes having a density range from 0.880 to 0.915 g/cc. Generally, VLDPE is a substantially linear polymer, with high levels of short chain branches, commonly made by copolymerization of ethylene with a short-chain alpha-olefin such as 1-butene, 1-hexene, and 1-octene. VLDPE can be produced using metallocene catalysts due to the greater co-monomer incorporation exhibited by these catalysts.

Any VLDPE with a density from 0.880 to 0.915 g/cc can be used to make the self-opening bag pack disclosed herein. In some embodiments, the density of the VLDPE is from about 0.880 to about 0.915 g/cc, from about 0.885 to about 0.910 g/cc, or from about 0.890 to about 0.905 g/cc.

The amount of VLDPE in the polymer composition can be less than about 50 wt. %, less than about 45 wt. %, less than about 40 wt. %, less than about 35 wt. %, less than about 30 wt. %, less than about 25 wt. %, less than about 20 wt. %, less than about 15 wt. %, less than about 10 wt. %, less than about 5 wt. %, less than about 1 wt. %, less than about 0.1 wt. %, or less than about 0.01 wt. %, based on the total weight of the polymer composition. In certain embodiments, the amount of VLDPE in the polymer composition is from about 0 wt. % to about 49 wt. %, from about 0.01 wt. % to about 45 wt. %, from about 0.1 wt. % to about 40 wt. %, from about 0.5 wt. % to about 35 wt. %, from about 1 wt. % to about 30 wt. %, from about 1 wt. % to about 25 wt. %, from about 1 wt. % to about 20 wt. %, from about 1 wt. % to about 15 wt. %, or from about 1 wt. % to about 10 wt. %, based on the total weight of the polymer composition. In some embodiments, the polymer composition is substantially free of VLDPE.

Optionally, the polymer compositions disclosed herein can comprise UHMWPE which can include polyethylenes having a molecular weight in the range from about 3.1 to about 5.67 million. The ultra high molecular weight results in less efficient packing of the chains into the crystal structure as evidenced by their densities less than those of high density polyethylenes (e.g., from about 0.935 to about 0.930 g/cc). UHMWPE can be made from ethylene using any catalyst system such as Ziegler catalysts.

The amount of UHMWPE in the polymer composition can be less than about 50 wt. %, less than about 45 wt. %, less than about 40 wt. %, less than about 35 wt. %, less than about 30 wt. %, less than about 25 wt. %, less than about 20 wt. %, less than about 15 wt. %, less than about 10 wt. %, less than about 5 wt. %, less than about 1 wt. %, less than about 0.1 wt. %, or less than about 0.01 wt. %, based on the total weight of the polymer composition. In certain embodiments, the amount of UHMWPE in the polymer composition is from about 0 wt. % to about 49 wt. %, from about 0.01 wt. % to about 45 wt. %, from about 0.1 wt. % to about 40 wt. %, from about 0.5 wt. % to about 35 wt. %, from about 1 wt. % to about 30 wt. %, from about 1 wt. % to about 25 wt. %, from about 1 wt. % to about 20 wt. %, from about 1 wt. % to about 15 wt. %, or from about 1 wt. % to about 10 wt. %, based on the total weight of the polymer composition. In some embodiments, the polymer composition is substantially free of UHMWPE.

Optionally, the polymer compositions disclosed herein can comprise at least one additive for the purposes of improving and/or controlling the processibility, appearance, physical, chemical, and/or mechanical properties of the polymer compositions. Any plastics additive known to a person of ordinary skill in the art may be used in the polymer compositions disclosed herein. Non-limiting examples of suitable additives include colorants or pigments, fillers, slip agents, plasticizers, oils, antioxidants, UV stabilizers, lubricants, antifogging agents, flow aids, coupling agents, cross-linking agents, nucleating agents, surfactants, solvents, flame retardants, antistatic agents, polysiloxanes and combinations thereof. In some embodiments, the polymer compositions do not comprise a polysiloxane, a slip agent, a plasticizer, an oil, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent or any combination of two or more of the additives. In further embodiments, the polymer compositions do not comprise an additive.

When used, the total amount of the additives can range from about greater than 0 wt % to about 50 wt %, from about 0.001 wt % to about 40 wt %, from about 0.01 wt % to about 30 wt %, from about 0.1 wt % to about 20 wt %, from about 0.5 wt % to about 10 wt %, or from about 1 wt % to about 5 wt %, based on the total weight of the polymer composition.

Some polymer additives have been described in Zweifel Hans et al., *"Plastics Additives Handbook,"* Hanser Gardner Publications, Cincinnati, Ohio, 5th edition (2001), which is incorporated herein by reference in its entirety.

In some embodiments, the polymer compositions disclosed herein optionally comprise a colorant or pigment that can change the look of the polymer compositions to human eyes. Any colorant or pigment known to a person of ordinary skill in the art may be added to the polymer compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer composition can be from about greater than 0 to about 10 wt %, from about 0.1 to about 5 wt %, or from about 0.25 to about 3 wt %, based on the total weight of the polymer composition. In some embodiments, the polymer compositions comprise a white or yellow colorant. In other embodiments, the polymer compositions do not comprise a colorant or pigment. Some colorants have been described in Zweifel Hans et al., *"Plastics Additives Handbook,"* Hanser Gardner Publications, Cincinnati, Ohio, 5th edition, Chapter 15, pages 813-882 (2001), which is incorporated herein by reference.

Optionally, the polymer compositions disclosed herein can comprise a filler which can be used to adjust, inter alia, volume, weight, costs, and/or technical performance. Any filler known to a person of ordinary skill in the art may be added to the polymer compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. In further embodiments, the filler is calcium carbonate. Where used, the amount of the filler in the polymer composition can be from about greater than 0 to about 80 wt %, from about 0.1 to about 60 wt %, from about 0.5 to about 40 wt %, from about 1 to about 30 wt %, or from about 10 to about 40 wt % of the total weight of the polymer composition. In some embodiments, the polymer compositions do not comprise a filler. Some fillers have been disclosed in U.S. Pat. No. 6,103,803 and Zweifel Hans et al., *"Plastics Additives Handbook,"* Hanser Gardner Publications, Cincinnati, Ohio, 5th edition, Chapter 17, pages 901-948 (2001), both of which are incorporated herein by reference.

Optionally, the polymer compositions provided herein contain an anti-blocking or slip agent. The anti-blocking agent can be used to prevent the undesirable adhesion between touching layers of articles made from the polymer composition particularly under moderate pressure and heat during storage, manufacture or use. Any anti-blocking agent known to a person of ordinary skill in the art may be added to the filled polymer compositions provided herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the filled polymer compositions can be from about greater than 0 to about 3 wt %, from about 0.0001 to about 2 wt %, from about 0.001 to about 1 wt %, or from about 0.001 to about 0.5 wt % of the total weight of the filled polymer composition. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Optionally, the polymer compositions disclosed herein can comprise a plasticizer. In general, a plasticizer is a chemical that can increase the flexibility and lower the glass transition temperature of polymers. Any plasticizer known to a person of ordinary skill in the art may be added to the polymer compositions disclosed herein. Non-limiting examples of plasticizers include abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the polymer composition can be from greater than 0 to about 15 wt %, from about 0.5 to about 10 wt %, or from about 1 to about 5 wt % of the total weight of the polymer composition. In some embodiments, the polymer compositions do not comprise a plasticizer. Some plasticizers have been described in George Wypych, "*Handbook of Plasticizers*," ChemTec Publishing, Toronto-Scarborough, Ontario (2004), which is incorporated herein by reference.

In some embodiments, the polymer compositions disclosed herein optionally comprise an antioxidant that can prevent the oxidation of polymer components and organic additives in the polymer compositions. Any antioxidant known to a person of ordinary skill in the art may be added to the polymer compositions disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer composition can be from about greater than 0 to about 5 wt %, from about 0.0001 to about 2.5 wt %, from about 0.001 to about 1 wt %, or from about 0.001 to about 0.5 wt % of the total weight of the polymer composition. In some embodiments, the polymer compositions do not comprise an antioxidant. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the polymer compositions disclosed herein optionally comprise an UV stabilizer that may prevent or reduce the degradation of the polymer compositions by UV radiations. Any UV stabilizer known to a person of ordinary skill in the art may be added to the polymer compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer composition can be from about greater than 0 to about 5 wt %, from about 0.01 to about 3 wt %, from about 0.1 to about 2 wt %, or from about 0.1 to about 1 wt % of the total weight of the polymer composition. In some embodiments, the polymer compositions do not comprise a UV stabilizer. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

Optionally, the polymer compositions disclosed herein can comprise a lubricant. In general, the lubricant can be used, inter alia, to modify the rheology of the molten polymer compositions, to improve the surface finish of molded articles, and/or to facilitate the dispersion of fillers or pigments. Any lubricant known to a person of ordinary skill in the art may be added to the polymer compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer composition can be from about greater than 0 to about 5 wt %, from about 0.1 to about 4 wt %, or from about 0.1 to about 3 wt % of the total weight of the polymer composition. In some embodiments, the polymer compositions do not comprise a lubricant. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer compositions disclosed herein can comprise an antistatic agent. Generally, the antistatic agent can increase the conductivity of the polymer compositions and to prevent static charge accumulation. Any antistatic agent known to a person of ordinary skill in the art may be added to the polymer compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. In some embodiments, the polymer compositions do not comprise an antistatic agent. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In further embodiments, the polymer compositions disclosed herein optionally comprise a cross-linking agent that can be used to increase the cross-linking density of the polymer compositions. Any cross-linking agent known to a person of ordinary skill in the art may be added to the polymer compositions disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the polymer composition can be from about greater than 0 to about 20 wt %, from about 0.1 to about 15 wt %, or from about 1 to about 10 wt % of the total weight of the polymer composition. In some embodiments, the polymer compositions do not comprise a cross-linking agent. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

Optionally, the polymer compositions disclosed herein can comprise at least a polysiloxane additive. Any polysiloxane that (1) can provide processing improvements, such as better mold filling, less extruder torque, internal lubrication, mold release and faster throughput, and/or (2) can modify surface characteristics, such as higher lubricity, less slip, lower coefficient of friction, and greater mar and abrasion resistance can be used. In some embodiments, the polysiloxane is or comprises a high molecular weight polysiloxane. In further embodiments, the polysiloxane is or comprises an ultra-high molecular weight polydialkylsiloxane. Some non-limiting examples of polydialkylsiloxane include polydialkylsiloxanes having a $C_{1-4}$ alkyl group, such as polydimethylsiloxanes, polydiethylsiloxanes, polymethylethylsiloxanes, polydipropylsiloxanes and polydibutylsiloxanes. In certain embodiments, the polysiloxane additive is or comprises a mixture of an ultra-high molecular weight polydialkylsiloxane and a polyolefin, such as polyethylene, polypropylene or a combination thereof. Some non-limiting examples of such polysiloxane mixtures include DOW CORNING® MB50 series Masterbatches such as DOW CORNING® MB50-001, MB50-002, MB50-313, MB50-314 and MB50-321, all of which are available from Dow Corning Corporation, Midland, Mich.

In other embodiments, the polysiloxane is or comprises a liquid polysiloxane. Some non-limiting examples of liquid polysiloxane include low molecular weight polydialkylsiloxanes, low molecular weight polyalkylphenylsiloxanes, and modified siloxane oils such as olefin-modified siloxane oils, polyether-modified silicone oils, olefin/polyether-modified silicone oils, epoxy-modified silicone oils and alcohol-modified silicone oils.

In some embodiments, the polysiloxane additive is or comprises a polydialkylsiloxane having a viscosity from about 1,000 to about 100,000 centistokes. In other embodiments, the polysiloxane additive is or comprises a polydialkylsiloxane having a viscosity from about 100,000 to about 1,000,000. In further embodiments, the polysiloxane additive is or comprises a polydialkylsiloxane having a viscosity from about 1,000,000 to about 10,000,000 centistokes. In certain embodiments, the polysiloxane additive is or comprises a polydialkylsiloxane having a viscosity from about 10,000,000 to about 50,000,000 centistokes.

When used, the amount of the polysiloxane additive in the polymer composition can be from about 0.1 wt % to about 5.0 wt %, based on the total weight of the polymer composition. In some embodiments, the amount of the polysiloxane additive in the polymer composition is from about 0.1 wt % to about 1.0 wt %, or from about 1 wt % to about 5 wt %, based on the total weight of the polymer composition. In other embodiments, the amount of the polysiloxane additive in the polymer composition is from about 0.15 wt % to about 0.4 wt %, based on the total weight of the polymer composition. In some embodiments, the polymer compositions do not comprise a polysiloxane.

The ingredients of the polymer compositions, e.g., MDPE, HDPE and the optional additives, can be mixed or blended using methods known to a person of ordinary skill in the art, preferably methods that can provide a substantially homogeneous distribution of the polypropylene and/or the additives in the ethylene/α-olefin interpolymer. Non-limiting examples of suitable blending methods include dry blending, melt blending, solvent blending, extruding, and the like.

In some embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer composition. The mixing or blending of polymers by extrusion has been described in C. Rauwendaal, "*Polymer Extrusion*", Hanser Publishers, New York, N.Y., pages 322-334 (1986), which is incorporated herein by reference.

The polymer compositions disclosed herein can be used to manufacture self-opening bag pack disclosed herein. The polymer compositions can be first turn into continuous polyethylene tubes with known polymer processes such as extrusion (e.g., sheet extrusion and profile extrusion). The continuous polyethylene tubes can then be converted into self-opening bag packs according to techniques discussed later. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

In one embodiment, the self-opening bag pack disclosed herein comprises or is obtainable from a mixture comprising at least 50 wt. % of MDPE and less than 45 wt. % of HDPE. Such self-opening bags have an overall look similar to that of HDPE bags and/or a puncture resistance and softness similar to those of the more expensive LDPE and LLDPE bags.

In another embodiment, the self-opening bag pack disclosed herein comprises or is obtainable from a mixture comprising at least 50 wt. % of MDPE and less than 45 wt. % of LLDPE. Such self-opening bags can have an overall look and feel similar to those of LDPE or LLDPE bags; can be stronger and more economical than LDPE or LLDPE bags; and/or can have more consistent and reliable self-opening features.

In some embodiments, the self-opening bag packs disclosed herein comprise at least 50 wt. % of MDPE and do not need LLDPE or LDPE components to work effectively. In further embodiments, the self-opening bag packs disclosed herein do not need blending or co-extruding LLDPE or LDPE to create a reliable and consistent self-opening feature.

In one embodiment, the self-opening bag pack disclosed herein comprises two types of MDPE which are FB2310 having a density of 0.931 g/cc and a melt index (MI) of 0.20; and TR 131 having a density of 0.938 g/cc and a melt index (MI) of 0.20. The density and melt index of MDPE FB2310 and TR 131 are lower than those of HDPE. The MDPE FB 2310, if added to a polymer composition for producing LLDPE bags, can make the LLDPE bags softer and more durable. The MDPE TR 131, if added to a polymer composition for producing HDPE bags, can make the HDPE bags firmer and stronger.

In one embodiment, the self-opening bag pack disclosed herein is obtainable from a polymer composition comprising 45 wt. % of MDPE (FB2310), 45 wt. % of HDPE (7000F) and 10% of a white masterbatch.

In some embodiments, a low density polyethylene material, such as LLDPE is advantageously blended with the MDPE and HDPE in the polymer composition in an amount from about 4 wt. % to about 10 wt. % or higher. In other embodiments, the polymer composition can also include regrind materials, i.e. recovered film waste, in an amount of up to about 65 wt. %. In further embodiments, the polymer composition can also include various coloring agents and/or pigments, such as titanium dioxide, in an amount from about 3 wt. % to about 5 wt. %.

Figure 2:
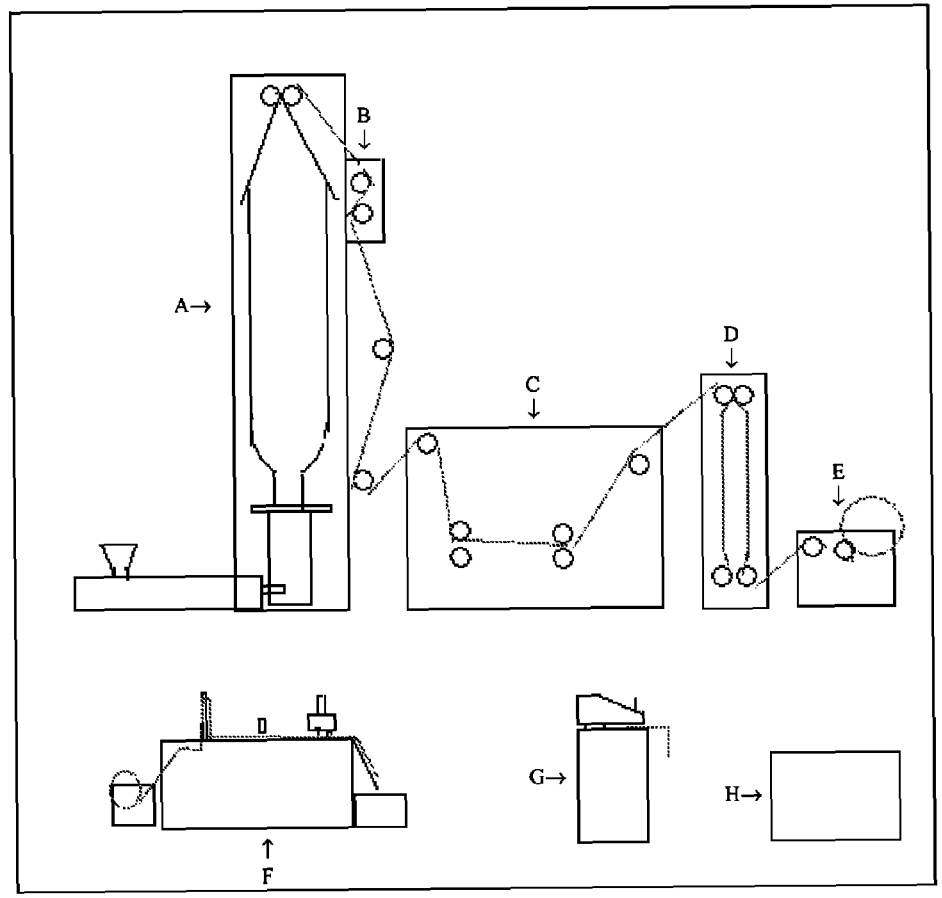
FIG. 2 is a diagram illustrating another embodiment of the process for producing a stack of self-opening bags disclosed herein.

Some embodiments of the process employed to form the self-opening bag stack disclosed herein are set forth in the block flow diagram of FIG. 1 and in the scheme of FIG. 2. Some of the steps in FIG. 1 and FIG. 2 are optional, i.e., the self-opening bags disclosed herein can be made according to FIG. 1 or FIG. 2 without the optional steps. In some embodiments, the gusset forming step, printing step and final packaging step in FIG. 1 or FIG. 2 are optional. In other embodiments, the corona treatment step in FIG. 1 or FIG. 2 is optional. Referring to FIG. 2, the first step is the film blowing step (A). In film blowing step (A), a polyethylene composition disclosed herein is extruded and blown into a continuous polyethylene tube by a blown film extrusion equipment in any manner known in the art. Any blown film extrusion equipment known in the art can be used to produce the polyethylene tube. Next, the polyethylene tube can be flattened into a continuous film by passing through nip rolls or other flattening devices. The width of the film can be controlled by the diameter of the polyethylene tube which can be in turn controlled by the diameter of the die, air flow velocity, velocity of the nip rolls, blow-up ratio and the like. The width of the film can generally vary from about 5 cm to about 100 cm. In some embodiments, the width of the film is from about 20 cm to about 50 cm. Further, the film can have a thickness from about 10.16 microns to about 20.32 microns (i.e., about 0.4 mil to about 0.8 mil). In some embodiments, the film has a thickness from about 12.7 microns to about 15.24 microns (i.e., from about 0.5 mil to about 0.6 mil).

After the film is formed, the film can be optionally processed by the corona treatment step (B). Any corona treating device known in the art can be used to treat the surfaces of the film. The surface treatment generally increases the surface tension of the film surfaces and/or roughens the film surface. It is believed that a higher surface tension or a rougher surface can increase the adhesion of printing inks to the corona-treated film surface or adhesion between two adjacent corona-treated film surfaces. After the corona treatment, the corona-treated film can optionally be printed with figures, texts, logo and the like in the printing step (C). Depending on the product requirements, the film can go through the optional gusset forming step (D) in which the use of a conventional gusset forming device which tucks in the sides of the film to thereby form integral gussets longitudinally along the length of the film. Next, the film is rolled up to form a film roll in the optional rolling up step (E). In the bag forming step (F), the film roll can be cut, heat sealed and made into packs or stacks of half-completed bags with a bag forming equipment. Any conventional bag forming equipment can be used to form the bag packs. The length of the bags can generally vary from about 5 cm to about 100 cm. In some embodiments, the length of the bags is from about 30 cm to about 70 cm. Each bag pack may have from 20 to 300 bags. In some embodiments, each bag pack has from 50 to 150 bags. In the die cutting and pressing step (H), the half-completed bags can be cut into any useful shape, e.g., T-shirt type shape, by a cutting die with the help of a press or compressor. Further, a portion of the bag pack may be compressed locally with a rod, which can have any cross-sectional shape, e.g., round, square, oval, rectangular, triangular, diamond, crescent and the like. In the packaging step (H), the bag packs are collected into packages and stored.

Plastic bags disclosed herein can have many different sizes. Sizes can vary from a few centimeters on a side to several meters on a side for large items. In some embodiments, the thickness of the material used for the plastic bags disclosed herein varies from about 0.02 mm for a very light-duty bag to about 1 mm for very heavy duty bag.

Plastic bags disclosed herein can have many different shapes. In some embodiments, the plastic bags disclosed herein are shaped like two identically-sized rectangular plastic sheets fused together on three of the sides, with one side open. This type of shape generally allows for simple, economic manufacturing and compact storage of the bags before use. In other embodiments, the plastic bags disclosed herein are made with carrying handles, and in other shapes. In certain embodiments, the plastic bags disclosed herein have self-opening features, i.e., features that open, by pulling the first bag in the front a bag pack, the second bag next behind the first bag.

The T-shirt type plastic bags are commonly used to bag groceries and other merchandise. T-shirt bags are generally pleated bags which can be closed, by heat sealing, at a bottom edge, and have a pair of integral loop handles extending upwardly to define an open mouth of the bag therebetween. T-shirt bags are generally provided in packs of aligned bags and these packs of bags are usually used in conjunction with bagging racks.

In some embodiments, the self-opening bags disclosed herein are T-shirt type bags. T-shirt type bags generally comprise laterally spaced handles integrally extending upwardly from opposed sides of an open portion of the bag to provide ease in carrying of the bag by consumers. T-shirt type bags can be used by grocery and retail stores in the form of packs, each of which includes a plurality of bags, typically from 50 to 200 bags per pack. The pack can be mounted on a rack for consecutive detachment of the bags from the pack. The rack can also hold the bags in an open position for loading by consumers or sales clerks.

In some embodiments, T-shirt bags are manufactured by a process comprising the steps of (a) providing a polymer composition comprising at least about 50 wt. % of a medium density polyethylene and less than about 45 wt. % of a high density polyethylene, based on the total weight of the polymer composition; (b) forming a film from the polymer composition by a blown film extrusion process; and (c) converting the film into the self-opening bag. In some embodiments, the film is in the form of a continuous extruded tube in a manner which is well known in the art. Typically, the film has a thickness from about 5 micrometers to about 25 micrometers, from about 10 micrometers to about 20 micrometers or from about 12 micrometers to about 16 micrometers.

In other embodiments, a continuous extruded tube of plastic, such as HDPE or LDPE, having the desired color, thickness, and/or diameter can be formed on an extrusion machine such as a single screw or twin screw extruder. The continuous tube can then be passed over rollers which can flatten the tube into a film and also roll the flattened tube or film onto a spool. The flattened tube or film can be subjected to corona surface treatment by a high voltage corona discharge electrode or other known methods to electrically and chemically change the entire outer surface of the continuous plastic tube. The corona treatment can cause electrical and chemical changes on the outer surfaces of the plastic tube and thus the plastic bags made from the plastic tube. The corona treatment may increase the polarity and/or the surface tension of the outer surfaces of the bags. The increased surface tension enables two adjacent corona-treated surfaces adhering releasably together. Therefore, other known methods to electrically and chemically change the entire outer surface of the continuous flatten tube can be used to substitute corona treatment. In some embodiments, the entire outer surfaces of the rolls of continuous flatten tube are surface-treated. In other embodiments, at least a portion of each of the outer surfaces of the rolls of continuous flatten tube are surface-treated.

In some embodiments, after being corona surface treated and rolled (if the bags might be printed), the roll of continuous flatten tube is unrolled and optionally can be then pleated on a pleating machine. Following this, a bagging machine heat seams and cuts sections of the pleated tube at top and bottom edges to form closed and flattened pleated bags of a desired length and width, with the pleated sides being at both sides of the flattened pleated bags. These sections are often referred to as pillowcases. Further downstream of the heat seaming and cutting step, the pillowcases are stacked in aligned stacks. Thereafter, hydraulic die cutting or other cutting methods are utilized to remove material at the stacked pillowcases' top portions to form the handles with apertures passing therethrough, and to form a mouth tab portion with an aperture to support the pack of self-opening bags on hooks positioned on a bagging rack. Each loop handle will comprise four layers of plastic material since they are cut out from the pleated side portions of the bag.

The self-opening bags disclosed herein can be made by any other self-opening bag making methods known by skilled artisans. Some known processes of making self-opening bags are disclosed in U.S. Pat. Nos. 6,446,810, 6,435,350, 6,089,514, 5,941,392, 5,938,033, 5,865,313, 5,695,064, 5,670,013, 5,469,969 and 5,213,145, all of which are incorporated herein by reference.

In some embodiments where quick and easy loading of bags is desirable, packs of T-shirt bags are generally supported on a bagging rack as merchandise is loaded into the bags to overcome the lack a of self-standing ability.

The T-shirt bags are available in more than one style. In some embodiments, they are in packs of bags and bagging racks for use therewith. In further embodiments, the bagging rack has a support base, a wire rear wall with a tab receiving hook, and two wire arms extending forwardly over the base. In the center top portion of the arms, the wire is formed so as to have a section which will spread and hold apart the handles of T-shirt bags engaged therewith to open up the mouth of the T-shirt bag. The pack of T-shirt bags used with these styles of bagging racks consists of a stack of overlapped and aligned bags which have a lower bag portion with two handles extending upwardly at both sides of the mouth of the bags. A central tab portion is provided on the mouth of the bags between the two handles, and the central tab portions of the pack of bags are heat-sealed together. The heat sealed central tabs thus form a stack or book of central tabs and have a central tab slit formed therethrough. The central tab slit is engaged with the tab receiving hook on the rear wall of the bagging rack, and the bock of central tabs will remain engaged therewith, even after individual bags are removed. Below the central tab slit a tearing slit is provided which traverses almost the entire distance of the central tabs except for a small distance at both sides of the central tab portion. The tearing slit allows the individual bags to be torn off the pack of bags as they are needed, and looped onto the bagging rack.

In further embodiments, the bagging rack has a bottom support base and a rear wire wall with a tab receiving hook located thereon. However, to open up each individual bag for loading, instead of looping the handles of the bags over the top of the support arm one at a time, as is done with the first type of pack of bags and rack, these racks have two handle support rods extending forwardly from the rear wire wall of the racks. The pack of T-shirt bags used with these styles of racks are similar to those used with the first type of rack, except that aligned apertures with flaps are formed on each handle of the pack of bags, through which pass the handle support rods of the bagging racks.

As known in the art, the tubular film can be extruded in an inflated condition and then collapsed and wound up in a flattened condition. Following the flattening of the film, but prior to wind up, the flattened film can be subjected to a corona treatment on both sides of the flattened film employing conventional corona electrodes. Corona treatment processes are well known in the art and are conventionally employed with all of the various grades of polyethylene films in order to provide an ink receptive surface.

In general, corona treatment can be accomplished by employing an electrode suspended adjacent the film and operating against a dielectric roll, for example, a silicone covered roll which supports the film. Corona treating devices for flattened tubular film are commercially available from numerous sources.

The degree of corona treatment applied to a blown film depends on various factors including the surface area of the electrode, the wattage supplied to the electrode and the speed of the film moving beneath the electrode. In some embodiments, these conditions are adjusted to provide a corona treatment sufficient to result in a surface tension level on the treated HDPE film surface of at least about 40 dynes/cm or about 44-46 dynes/cm or more. A corona treatment above this level may be greater than the degree of corona treatment required to result in a water-based ink adherent surface on the HDPE film. In general, a corona treatment at a level sufficient to provide a surface tension level of greater than about 40-42 dynes/cm is sufficient to provide a bondable HDPE surface. However, higher treatment levels can increase bond strength and improve results even further. In the state of the art, the corona treatment provides a surface tension level of about 44-46 dyne/cm in the case of HDPE film. In distinction, for the present invention the surface tension level is at least about 38 dynes/cm.

In general, corona treatment is accomplished by employing an electrode, such as electrode, suspended adjacent the film and operating against a dielectric roll, for example, a silicone covered roll which supports the film. Corona treating devices for flattened tubular film are commercially available from numerous sources.

Generally, the degree of corona treatment applied to the film depends on various factors including the surface area of the electrode, the wattage supplied to the electrode and the speed of the film moving beneath the electrode. In some embodiments, the corona treatment can be used to increase the surface tension of the corona-treated surface to at least about 20 dynes/cm, at least about 25 dynes/cm, at least about 30 dynes/cm, at least about 32 dynes/cm, at least about 34 dynes/cm, at least about 36 dynes/cm, at least about 38 dynes/cm, at least about 40 dynes/cm, at least about 42 dynes/cm, at least about 44 dynes/cm, at least about 46 dynes/cm, at least about 48 dynes/cm, at least about 50 dynes/cm, or at least about 52 dynes/cm. In other embodiments, the surface tension of the corona-treated surface is at least about 30 dynes/cm, at least about 32 dynes/cm, at least about 34 dynes/cm, at least about 36 dynes/cm, at least about 38 dynes/cm, or at least about 40 dynes/cm. The surface tension of the non-treated or corona-treated films can be measured according to ASTM D724: *Standard Test Method for Wetting Tension of Polyethylene and Polypropylene Films*, which is incorporated herein by reference.

In some embodiments, the self-opening bags can comprise at least a side gusset or bottom gusset. The gussets can be formed by any conventional gusset forming method. The gusset forming members can be tucked in the sides of the tube to thereby form integral gussets longitudinally along the length of the film. In some embodiments, the gusset forming step is conducted while the tube is maintained in an inflated state. In other embodiments, each of side gussets includes opposed outer surfaces within gusset, opposed outer surfaces of side gussets being in contact with each other and wherein at least one of gusset surfaces is free from corona discharge treatment. In further embodiments, the inner surfaces of the self-opening bags disclosed herein are free from corona discharge treatment, while the outer surfaces are all treated.

In some embodiments, the gusseted film tube is passed to a cutting and sealing operation. In further embodiments, the gusseted film tube can be passed to a pair of cutting and heat sealing members which cut and heat seal the continuous flattened tube into individual bag length blanks which are then stacked in registration in packs or stacks. In certain embodiments, each pack has from about 10 to about 300 bags, from about 20 to about 300 bags, from about 30 to about 300 bags, or from about 30 to about 250 bags. In some embodiments, the bag pack comprises between about 30 and about 300 bags.

Any die cutting device that can cut a plurality of plastic bags can used herein. In some embodiments, die cutting device includes a first continuous blade which cuts the top of the bags and forms both the mouth and the integral, laterally spaced, upwardly extending side handles.

In some embodiments, the self-opening bags can comprise at least a localized compressed area. The localized compressed area can be formed mechanically with a compressing devise under pressure. The compressing devise can be of any shape or size that is suitable for forming the compressed areas disclosed herein. In some embodiments, the compressing devise is in the shape of a uniform rod. The cross section of the uniform rod may be of any shape and size. In some embodiments, the cross section is in the shape of circle, rectangle, star, oval, parallelogram, or a polygon such as triangle, square and hexagon. Further, the shape can be regular or irregular. Further, the shape can be symmetrical or unsymmetrical. The compressing devise can be positioned to axially compress a portion of the bag pack. In some embodiments, the bag pack has a decreased thickness in each of the compressed areas from about 10% to about 90% less than the thickness of uncompressed The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Examples 1-10 and Comparative Examples A-B demonstrate some useful polymer compositions for making the self-opening bags disclosed herein.

Example 1 comprised a mixture of 75 parts of HDPE 7000F, 75 parts of MDPE FB2310, 12.5 parts of LLDPE 218W and 8 parts of white masterbatch. All parts are by weight.

Example 2 comprised a mixture of 125 parts of MDPE FB2310, 200 parts of LLDPE 218W, 25 parts of LDPE 200GG and 25 parts of white masterbatch. All parts are by weight.

Example 3 comprised a mixture of 125 parts of HDPE 9001, 150 parts of MDPE FB2310, 37.5 parts of LLDPE 6608, 15 parts of white masterbatch and 30 parts of recycled materials. All parts are by weight.

Example 4 comprised a mixture of 125 parts of HDPE 9001, 175 parts of MDPE FB2310, 37.5 parts of LLDPE 6608, 15 parts of white masterbatch and 20 parts of recycled materials. All parts are by weight.

Example 5 comprised a mixture of 125 parts of HDPE 7000F, 150 parts of MDPE FB2310, 25 parts of LLDPE 6910AA, 15 parts of white masterbatch and 10 parts of recycled materials. All parts are by weight.

Example 6 comprised a mixture of 150 parts of HDPE 7000F, 137.5 parts of MDPE FB2310, 50 parts of LLDPE 0209AA, 18 parts of white masterbatch, 20 parts of Hui Heng calcium carbonate and 40 parts of recycled materials. All parts are by weight.

Example 7 comprised a mixture of 125 parts of HDPE 7000F, 175 parts of MDPE FB2310, 37.5 parts of LLDPE 118N, 15 parts of white masterbatch and 40 parts of recycled materials. All parts are by weight.

Example 8 comprised a mixture of 125 parts of HDPE 7000F, 175 parts of MDPE TR 131, 25 parts of LLDPE 1535 and 20 parts of white masterbatch. All parts are by weight.

Example 9 comprised a mixture of 125 parts of HDPE 7000F, 175 parts of MDPE FB2310, 37.5 parts of LLDPE 0209AA, 5 parts of white masterbatch, 11.8 parts of yellow masterbatch 012C and 40 parts of recycled materials. All parts are by weight.

Example 10 comprised a mixture of 75 parts of HDPE 7000F, 75 parts of MDPE FB2310, 12.5 parts of LLDPE 218W, and 8 parts of white masterbatch. All parts are by weight.

Comparative Example A comprised a mixture of 200 parts of HDPE 7000F, 50 parts of MDPE FB2310, 50 parts of LLDPE 218W, and 15 parts of white masterbatch. All parts are by weight.

Comparative Example B comprised a mixture of 100 parts of HDPE 7000F, 50 parts of MDPE FB2310, and 25 parts of LLDPE 218W. All parts are by weight.

Samples of Comparative Example A, Comparative Example B, and Example 10 were prepared and tested according to ASTM D882 for breaking force (force required to break the sample), tensile strength at break in transverse direction (TD), and strain ratio (i.e., the ratio of the length of the sample at break to its initial length). Each sample has a length of 100 mm, a width of 10 mm and a thickness of 0.011 mm. The test results of Comparative Example A, Comparative Example B, and Example 10 are listed in Tables 1-3 respectively. The data show that Example 10 has a higher breaking force, tensile strength at break in transverse direction (TD), and strain ratio than both Comparative Example A and Comparative Example B.

TABLE 1

Test Results of Comparative Example A.

|  | Sample 1 | Sample 2 | Sample 3 |
|---|---|---|---|
| Breaking force (N) | 3.5375 | 3.7125 | 2.9000 |
| Width (mm) | 10.0 | 10.0 | 10.0 |
| Thickness (mm) | 0.011 | 0.011 | 0.011 |
| Tensile strength at break in TD (MPa) | 32.159 | 33.750 | 26.363 |
| Initial length (mm) | 100 | 100 | 100 |
| Length at break (mm) | 247 | 260 | 217 |
| Strain ratio (%) | 247.00 | 259.99 | 217.00 |

|  | Sample 4 | Sample 5 | Sample 6 |
|---|---|---|---|
| Breaking force (N) | 3.3375 | 3.6000 | 2.8500 |
| Width (mm) | 10.0 | 10.0 | 10.0 |
| Thickness (mm) | 0.011 | 0.011 | 0.011 |
| Tensile strength at break in TD (MPa) | 30.341 | 32.728 | 25.909 |
| Initial length (mm) | 100 | 100 | 100 |
| Length at break (mm) | 272 | 250 | 279 |
| Strain ratio (%) | 271.99 | 250.00 | 278.99 |
| Average Breaking force (N) | 3.3228 |  |  |
| Average tensile strength at break (MPa) | 30.208 |  |  |
| Average strain ratio | 254.16 |  |  |

TABLE 2

Test Results of Comparative Example B.

|  | Sample 1 | Sample 2 | Sample 3 |
|---|---|---|---|
| Breaking force (N) | 3.0750 | 3.6125 | 2.8187 |
| Width (mm) | 10.0 | 10.0 | 10.0 |
| Thickness (mm) | 0.011 | 0.011 | 0.011 |
| Tensile strength at break in TD (MPa) | 27.955 | 32.841 | 25.625 |
| Initial length (mm) | 100 | 100 | 100 |
| Length at break (mm) | 241 | 289 | 204 |
| Strain ratio (%) | 241.00 | 288.99 | 204.00 |

|  | Sample 4 | Sample 5 | Sample 6 |
|---|---|---|---|
| Breaking force (N) | 3.7062 | 3.8750 | 3.9000 |
| Width (mm) | 10.0 | 10.0 | 10.0 |
| Thickness (mm) | 0.011 | 0.011 | 0.011 |
| Tensile strength at break in TD (MPa) | 33.692 | 35.228 | 35.454 |
| Initial length (mm) | 100 | 100 | 100 |
| Length at break (mm) | 299 | 301 | 314 |
| Strain ratio (%) | 298.99 | 300.99 | 313.99 |
| Average Breaking force (N) | 3.4978 |  |  |
| Average tensile strength at break (MPa) | 31.798 |  |  |
| Average strain ratio | 274.66 |  |  |

TABLE 3

Test Results of Example 10.

|  | Sample 1 | Sample 2 | Sample 3 |
|---|---|---|---|
| Breaking force (N) | 3.9437 | 3.7687 | 4.0750 |
| Width (mm) | 10.0 | 10.0 | 10.0 |
| Thickness (mm) | 0.011 | 0.011 | 0.011 |
| Tensile strength at break in TD (MPa) | 35.853 | 34.261 | 37.045 |
| Initial length (mm) | 100 | 100 | 100 |
| Length at break (mm) | 264 | 276 | 286 |
| Strain ratio (%) | 263.99 | 275.99 | 285.99 |

|  | Sample 4 | Sample 5 | Sample 6 |
|---|---|---|---|
| Breaking force (N) | 3.8750 | 4.5874 | 4.4380 |
| Width (mm) | 10.0 | 10.0 | 10.0 |
| Thickness (mm) | 0.011 | 0.011 | 0.011 |
| Tensile strength at break in TD (MPa) | 35.228 | 41.704 | 40.341 |
| Initial length (mm) | 100 | 100 | 100 |
| Length at break (mm) | 292 | 304 | 305 |
| Strain ratio (%) | 291.99 | 303.99 | 304.99 |
| Average Breaking force (N) | 4.1143 |  |  |
| Average tensile strength at break (MPa) | 37.404 |  |  |
| Average strain ratio | 287.82 |  |  |

Samples of Comparative Example A, Comparative Example B, Example 10 and Example 5 were prepared and tested according to ASTM D882 for its tensile strength at break in both transverse direction (TD) and machine direction (MD), and strain ratio in both transverse direction (TD) and machine direction (MD). They were also tested for processability, Dart Drop Impact Test according to ASTM D1709, hardness and self-opening property. The test results are listed in Table 4 below. The data show that Examples 5 and 10 have higher tensile strengths at break and strain ratios in transverse direction (TD) than both Comparative Example A and Comparative Example B. Further, Examples 5 and 10 can sustain higher impacts from a falling dart than both Comparative Example A and Comparative Example B before 50% of tested films fail. The Dart Drop Impact Test was done according to ASTM D1709, which is incorporated herein by reference. Further, the self-opening test results show that merely 10% and 40% of the bags made from Comparative Example A and Comparative Example B respectively are self-opening, whereas 100% of the bags made from Examples 5 and 10 can be self-opened. The self-opening test can be done by placing a pack of self-opening bags made from each sample in a bagging rack and pulling the bags from the bagging rack one by one. When a bag is pulled, the subsequent bag may or may not be self-opened. The number of bags that are self-opening is observed and counted.

TABLE 4

Test Results of Comparative Example A-B and Examples 5 and 10.

| Test | | Comparative Example A | Comparative Example B | Example 10 | Example 5 |
|---|---|---|---|---|---|
| Processability | Temp. (° C.) | 200-210 | 190-200 | 190-200 | 190-200 |
| | Plasticization | Good | Good | Good | Good |
| Tensile Strength at break (MPa) | TD | 30.2 | 31.8 | 37.4 | 39.4 |
| | MD | 38.6 | 45.1 | 44.9 | 44.2 |
| Strain Ratio (%) | TD | 254 | 274 | 287 | 293.8 |
| | MD | 103.8 | 132 | 125.5 | 157.4 |
| Dart Drop Impact Test (g) | | 95 | 95 | 110 | 115 |
| Hardness | | Hard | Medium | Soft | Soft |
| Self-opening Test | | 10% | 40% | 100% | 100% |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. It is noted that the methods for making and using the self-opening bag pack are described with reference to a number of steps. These steps can be practiced in any sequence. One or more steps may be omitted or combined but still achieve substantially the same results. The appended claims intend to cover all such variations and modifications as falling within the scope of the invention.

All publications and patent applications mentioned in this specification are herein incorporated by reference to the same extent as if each individual publication or patent application was specifically and individually indicated to be incorporated by reference.

What is claimed is:

1. A method of making a pack of self-opening bags comprising the steps of:
   (a) providing a polymer composition comprising at least about 50 wt. % of a medium density polyethylene and less than about 45 wt. % of a high density polyethylene, based on the total weight of the polymer composition;
   (b) forming a film or continuous tube from the polymer composition;
   (c) converting the film or continuous tube into a plurality of self-opening bags; and
   (d) stacking the plurality of self-opening bags.

2. The method of claim 1, wherein the medium density polyethylene has a density from about 0.930 to about 0.940 g/cc.

3. The method of claim 1, wherein the medium density polyethylene has a melt index $MI_2$ from about 0.1 to about 0.3.

4. The method of claim 1, wherein the self-opening bags are of the T-shirt type.

5. The method of claim 1, wherein the continuous tube is flattened during the converting step, wherein the flattened structure comprises a film.

6. The method of claim 5 further comprising a step of corona-treating the surfaces of the film.

7. The method of claim 6 further comprising a step of forming at least one localized compressed area in the self-opening bags.

8. The method of claim 6, wherein the surface tension of the surface-treated surface is greater than about 30 dynes/cm.

9. The method of claim 1, wherein the polymer composition further comprising at least an additive selected from the group consisting of colorants or pigments, fillers, slip agents, plasticizers, oils, antioxidants, UV stabilizers, lubricants, antifogging agents, flow aids, coupling agents, cross-linking agents, nucleating agents, surfactants, solvents, flame retardants, antistatic agents, polysiloxanes, and combinations thereof.

10. A self-opening bag pack comprising a plurality of bags comprising or obtainable from a polymer composition comprising at least about 50 wt. % of a medium density polyethylene and less than about 45 wt. % of a high density polyethylene, based on the total weight of the polymer composition.

11. The self-opening bag pack of claim 10, wherein the polymer composition further comprising at least an additive selected from the group consisting of colorants or pigments, fillers, slip agents, plasticizers, oils, antioxidants, UV stabilizers, lubricants, antifogging agents, flow aids, coupling agents, cross-linking agents, nucleating agents, surfactants, solvents, flame retardants, antistatic agents, polysiloxanes, and combinations thereof.

12. The self-opening bag pack of claim 10, wherein each of the bags including a front wall, a rear wall, a bottom portion integrally connected with both the front wall and the rear wall, and a bag mouth opposed to the bottom portion, wherein the front and rear walls being integrally joined at their sides.

13. The self-opening bag pack of claim 12, wherein at least a portion of the outer surface of the front and rear walls of each of the bags having been surface-treated.

14. The self-opening bag pack of claim 10, wherein the medium density polyethylene has a density from about 0.930 to about 0.940 g/cc.

15. The self-opening bag pack of claim 10, wherein the medium density polyethylene has a melt index $MI_2$ from about 0.1 to about 0.3.

16. The self-opening bag pack of claim 10, wherein the bags are of the T-shirt type.

* * * * *